Fig. 5

Patented July 24, 1928.

1,678,245

UNITED STATES PATENT OFFICE.

WILLIAM E. DICKINSON AND JOSEPH J. MORGAN, OF NEW HAVEN, CONNECTICUT.

CAR-UNLOADING APPARATUS.

Application filed October 19, 1926. Serial No. 142,579.

This invention relates to apparatus for unloading freight cars and more particularly open top railway freight cars. The invention is adapted for general application, but is of particular utility when employed in the unloading of rails along the tracks of a railroad. In the maintenance of way of a railway system, it is necessary to continually substitute rail sections at different points, and it is frequently necessary that the work train which carries the rails to the points where they are needed has to travel on the main track. In order to keep the right of way clear, suitable switching is required, and it is manifestly of first importance that the unloading of the rails along the railway be accomplished as expeditiously as possible.

Under prior practice, the almost universal method of unloading rails from cars is to provide specially constructed derrick cars for this purpose. These cars are double ended; that is to say, they are provided with a derrick, mast and boom at each end and when a train of cars is sent out to distribute rails, at least one of these unloading cars forms part of the train. By switching, the unloading car is successfully placed between each two loaded cars and these cars are unloaded in succession, a separate switching operation being necessary for the unloading of each two cars. This requires considerable time and if the switching facilities are not convenient, relatively long runs must be made to reach a suitable switching point.

Unloading cars of the character described represent a relatively large investment. They are expensive to manufacture and maintain. Nevertheless in order to obviate the necessity of frequent switching, it is the practice for each division or section of the road to have allotted to it a relatively large number of such unloading cars, so that when a train is sent out to deliver rails along the right of way, one of these unloading cars may be positioned between each two loaded cars in order to overcome the necessity of time consuming switching operations and furthermore to expedite the unloading as much as possible in order that the right of way may be cleared for regular service.

The unloading mechanism of the unloading cars to which we have referred is almost universally operated by compressed air from the line of the train. This air is supplied from the locomotive air pump and it is found in practice that the operation of one unloading device draws upon the compressed air supply to such extent that it is not feasible to operate more than one or two of these unloading devices at one time. As a matter of fact, it is generally true that although there are several unloading cars in the same train, only one can be used at any one time, and all the rest must remain idle until their respective turns, due to the inability of the locomotive and air reservoirs to supply the compressed air needed for the conjoint operation of these unloading cars.

We wish to particularly call attention to the great amount of capital invested in cars of the character referred to. They constitute an appreciable item in overhead and maintenance, and it is one of the objects of this invention to eliminate the necessity for such cars.

Furthermore, in the operation of unloading cars as specified, it is essential that a locomotive be present at all times in order to furnish the compressed air for the operation of the lifting devices. It is also the object of this invention to eliminate the necessity of a locomotive for this purpose.

Viewing the invention from the broad aspect, however, it has for its object the provision of unitary unloading means so constituted that an entire train of cars can be unloaded expeditiously without requiring switching of the train and without necessitating the presence of a locomotive, other than for hauling the train of loaded cars.

Another object of the invention is to provide a lifting device so constructed that it may be readily mounted between successive cars of a train to permit of the unloading of said cars. This mechanism is so constituted that it utilizes the cars for support during operation and can be readily shifted from cooperative relation with two of such cars to each two additional cars of the train in succession, whereby the whole train may be unloaded without requiring any extraneous support for the unloading mechanism and without necessitating any train switching operation.

A further object of the invention is to render the unloading mechanism independent of the presence of the locomotive. In practice, this is accomplished by employing electrically operated hoisting means and associating with such means a source of electric current supply independent of the locomotive.

Another object of the invention is to so constitute the hoisting means that it may be mounted in place on the train under its own power and thus eliminate the necessity of employing a large crew of men for the unloading operations.

In the preferred form of the present invention, the hoisting mechanism consists of a mast and boom with which an electric hoist is associated. The boom is associated with the mast in the usual manner common to derrick construction, and the mast is adapted to be stepped into a support of such construction that it may be readily and expeditiously mounted between two consecutive cars of a train in such manner that two cars will collectively support the derrick. This arrangement has many practical advantages. It ties the derrick to both of said cars, permits a strong rigid support to be accomplished expeditiously and enables the derrick to work with equal facility in the unloading of both cars.

In the preferred form of the invention, the mounting for the mast of the derrick is preferably such as to permit this mounting to be positioned on the cars and firmly affixed in place before the mast is associated therewith. The mounting is relatively light in practice and can be handled conveniently by a small crew of men, so that it may be expeditiously prepared for the reception of the mast. As an adjunct to the apparatus, a davit is utilized. This davit is adapted to be mounted in any suitable manner on one of the cars and may be utilized in the causing of the electric hoist to mount the mast on the support previously prepared between the cars. The mast is guyed to the cars in any suitable manner.

By utilizing apparatus such as described, it is possible to expeditiously shift the hoisting apparatus to positions between successive cars to quickly unload a train through the employment of unitary unloading means.

The invention fulfills a long felt want in railway maintenance. It permits of the unloading of cars in a very expeditious and economical manner, and is thoroughly efficient in its operation.

Features of the invention, other than those adverted to, will be apparent from the hereinafter detailed description and claims, when read in conjunction with the accompanying drawings.

The accompanying drawings illustrate different practical embodiments of the invention, but the constructions therein shown, are to be understood as illustrative, only, and not as defining the limits of the invention.

Referring to the drawings, the several cars of a work train are designated I, II, III, IV, V. There can manifestly be any number of cars to a train and the train can be drawn by a locomotive, to the destination or place of work.

In the preferred form of the present invention, the unloading operation is carried out by electric power and when this power is employed, it is preferably supplied from generating apparatus contained in the car I. There is always a so-called "work car" to every work train, this car being used generally for conveying all tools incident to the work to be done.

In accordance with the present invention, there is installed in this work car I a motor generator set with suitable storage batteries or accumulators for the furnishing of a steady flow of power to the unloading apparatus.

Figure 1:
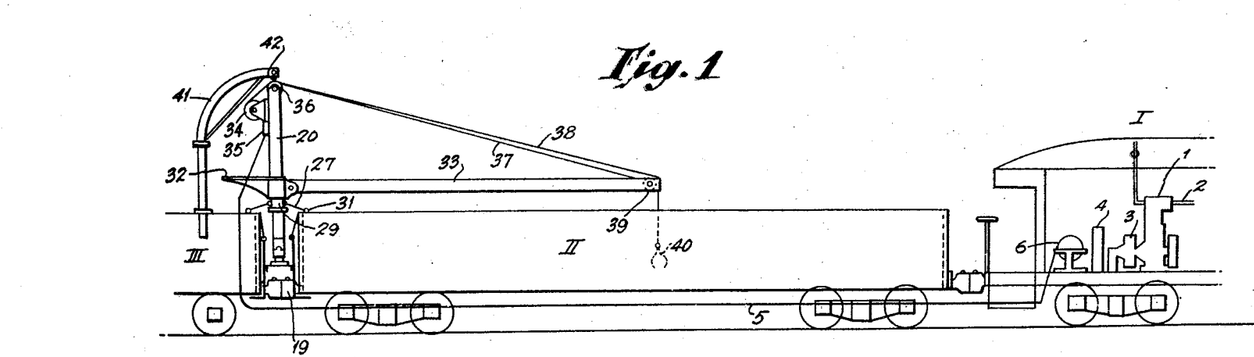
Figure 1 graphically illustrates a portion of a train of cars showing the present invention associated therewith.

In Figure 1, the car is shown as provided with a direct current generator set, here illustrated as embodying a steam turbine but adapted to be operated from a steam line 2 of the train and fed from a locomotive. While the locomotive is attached to the train, the steam turbine is operated to drive a current generator 3 and the thus generated current is fed to accumulators or storage batteries 4, where it is stored up until such time as desired. Current is fed from the storage battery through a current feed line 5 which, in the interest of convenience, is coiled about a spring reel 6, so that it may be wound or unwound from the reel as desired, and the reel may be of any well known conventional form. Current may, however, be fed direct from the generator to the hoisting apparatus.

Figures 2, 3:
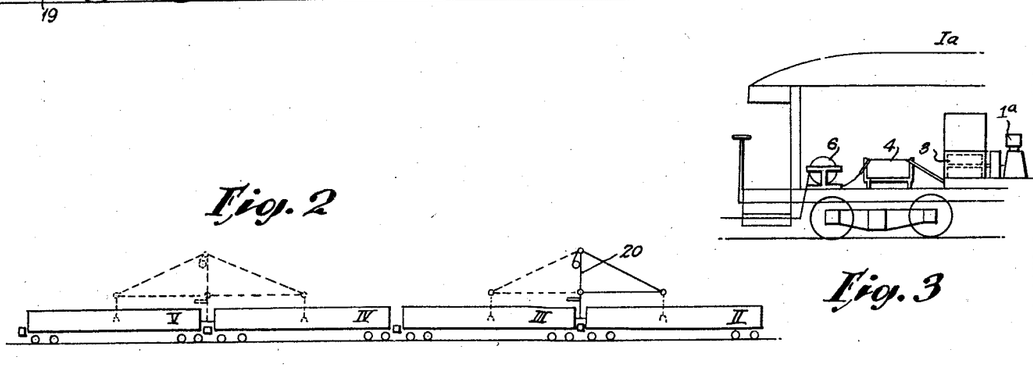
Figure 2 shows a further portion of the train and illustrates the adaptability of the invention to unload a number of cars in succession.
Figure 3 shows one end of a work car, one of which is generally associated with each train.

In the slightly modified construction of Figure 3, the car I$^a$ is provided with a reel 6.

accumulator 4 and a current generator 3, but this generator instead of being driven from a steam turbine is operated by an internal combustion engine 1ª, so that the generator set is here entirely independent of the locomotive.

We have shown these two generator sets as illustrative, but we wish it understood that the generator set of Figure 1 might be air operated or that any suitable generator set may be employed without departing from the spirit of this invention, so long as it will produce and store current and provide a source of current supply for hoisting mechanism at all times.

The hoisting mechanism of this invention is adapted to be mounted between any two consecutive cars of the train, the form of the invention shown being such as to adapt it for expeditious mounting on open top cars, such as are generally employed in the transportation of rails. The hoisting apparatus is constructed to be detachably supported upon a suitable mounting which it is desirable to so construct that said mounting may be supported on the cars and the derrick portion of the hoisting apparatus thereafter associated therewith. The mounting for the derrick portion is shown in detail in Figures 4 and 5. It embodies, in the preferred form of the invention, two saddles 7. Each of these saddles is substantially of inverted U shape with each free end of the U-shaped member having a lateral extension 8 forming a clamping jaw. The saddles are substantially rigid and may, if desired, be braced or stayed to reinforce them. They are both provided with a substantially flat top 9 and spaced apart on the flat top of each saddle are fixed stops 10. These stops are firmly secured to the saddles and are either cast integral with the saddles or permanently secured thereto. They are similarly positioned on both saddles and their function is to assist in properly positioning a bed plate adapted to rest on the saddles and to hold said bed plate against shifting in a direction longitudinally of the train.

Associated with each saddle is a clamp 11, which clamp is provided with a shank 12 and each shank 12 has therein a joint 13 which may, in practice, either be an ordinary hinge joint or a universal joint. The joints 13 are relatively close to the clamp 11 and below these joints the stems 12 are threaded throughout their length. These threaded portions 12 of the clamp stems are adapted to extend downwardly through slots 14 formed in and extending longitudinally of the saddles 7, and where they pass through the saddles, they are provided with bushings 15 above and below which are nuts 16. The bushings 15 are of sufficient length, so that the nuts can be tightly drawn toward one another against the ends of the bushing without gripping the saddles, and a construction is thus provided whereby the threaded stems of the clamps are secured to the saddles against relative vertical movement while providing a yieldable connection which will permit of longitudinal shifting of the bushings 15 in the slots 14, as will be clearly apparent from Figure 7. The slots 14 extend in a direction longitudinally of the train and the apparatus thereof will be hereinafter more fully explained.

Figure 5:
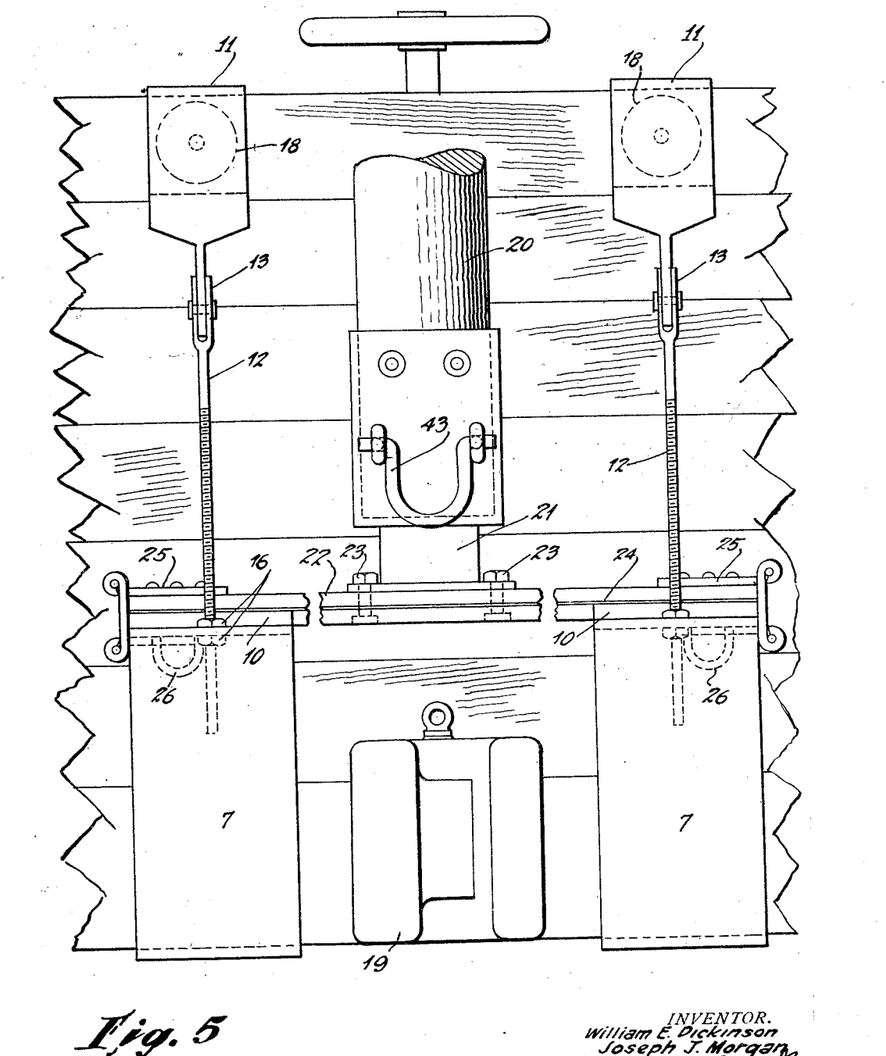
Figure 5 is a section on the line 5—5 of Figure 4.

In accordance with the preferred form of the invention, it is desirable to mount the saddles firmly between two adjacent cars of the train before associating therewith the derrick apparatus. This mounting is accomplished by so positioning the saddles that the flanges 8 thereof extend beneath the ends of the car bodies and hooking the clamps 11 over the upstanding ends of said bodies. The nuts 16 are retracted to substantially the ends of the stems 12 to permit the clamps to be hooked over the tops of the car ends and after this has been accomplished, the clamps are made rigid with the car ends by means of clamping screws 18 by which said clamps are firmly affixed to the cars. Thereafter the nuts 16 are tightened to draw the flanges 8 tightly against the bottoms of the car bodies for the purpose of firmly securing the saddles in position with one saddle on each side of the car coupling 19, as shown in Figure 5. When thus secured, the saddles will be rigidly mounted in juxtaposition between the two cars and will depend for their support upon said cars conjointly.

Figures 4, 7:
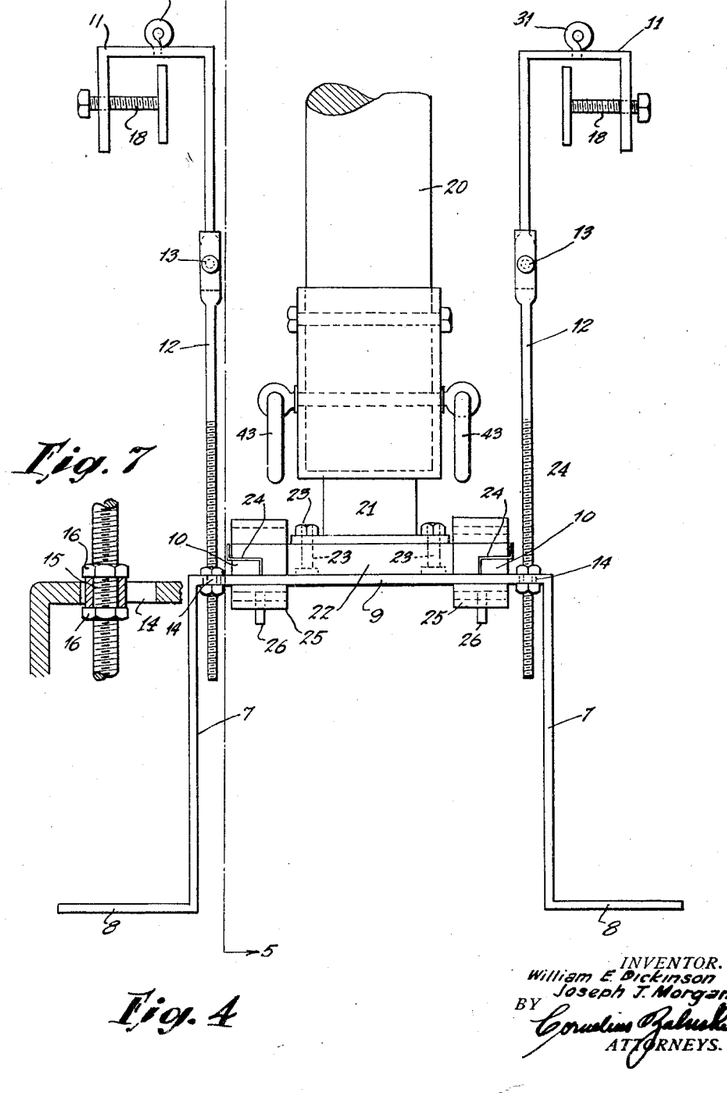
Figure 4 is a side elevation of means for supporting the derrick mounting on two contiguous cars.
Figure 7 is an enlarged detailed showing of a yielding connection employed in the construction.

It will be noted, however, that the slot and bushing connection 14—15, shown in Figure 7, will permit of sufficient yielding in the connection to take up slack of couplings, etc., due to movement of the train if the switching operation is desired, while the saddles are in the position described. Such relative movement between the cars is provided in order that there may be no breakage of the parts, due to excessive strains. The joints 13 facilitate the mounting of the parts particularly if the car ends are bent out of shape and it is to provide for this contingency that said joints are included in the structure. They may be omitted without departing from the invention.

The derrick embodies a mast 20, the lower end of which rotatably engages a mast step 21, which is mounted on a supporting bed 22 by means of bolts 23. This bed is sufficiently long to extend across both saddles, as shown in Figure 5, and is sufficiently wide to overlie stops 10, and the lateral edges of the plate are rabbeted, as shown at 24, to interfit with said stops and to thereby provide simple and convenient means for centering the bed plate upon the stirrups. The bed plate is provided at its opposite ends with double hinged hasps 25, which, after the bed plate is in position are adapted to be engaged with keepers 26 to firmly secure the bed plate to the saddles. The pin or other suitable means is preferably passed through the keepers to preclude inadvertent disengagement of the hasps therefrom.

Figures 6, 8:
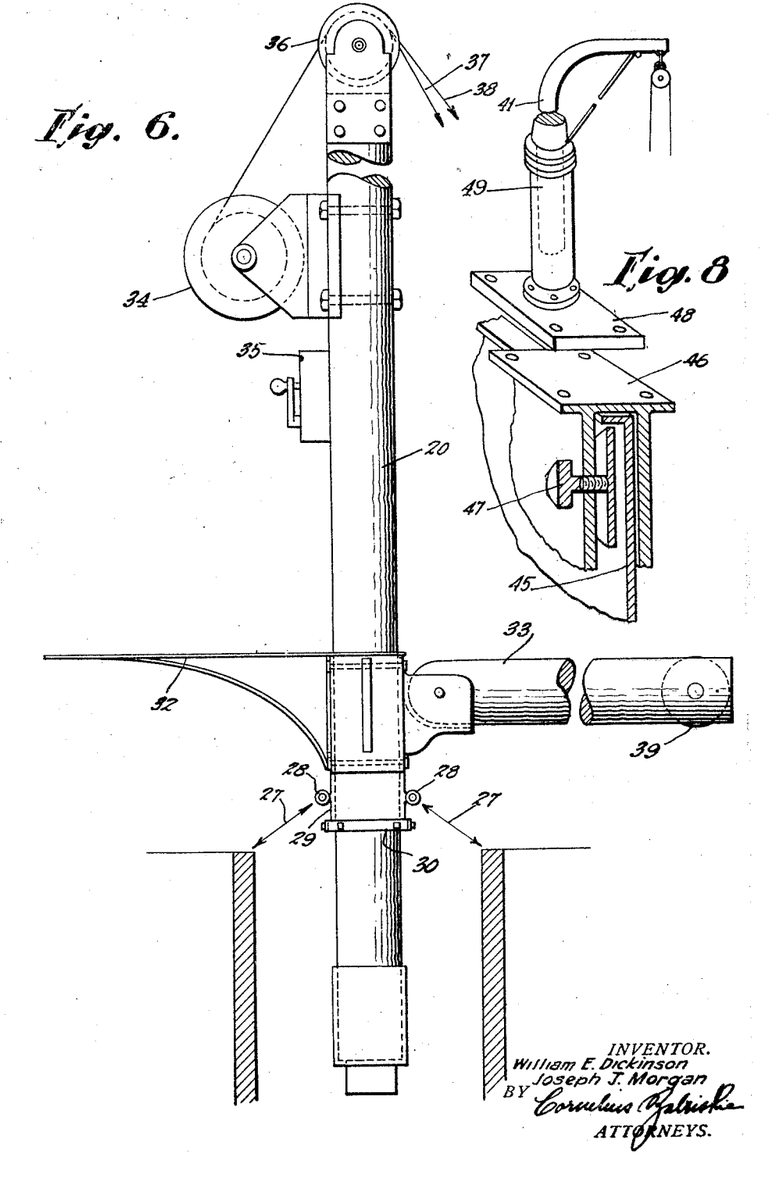
Figure 6 is a side elevation of a mast and boom portion of the apparatus, showing its general relationship to the cars when in mounted position.
Figure 8 is a perspective section showing the preferred form of davit mounting.

A mast is supported, as stated, in a step at the lower end thereof and it is guyed intermediate its top and bottom, as shown by the guy couples 27 in Figures 1 and 6. These guy couples, preferably four in number, are secured to a like number of rings 28 carried by a loose sleeve 29 encircling the mast above a fixed collar 30, while the opposite ends of the guy stays are adapted to be engaged with rings 31, one of which is carried by each clamp 11. Turn buckles are preferably included in the guy stays, so that these stays may be drawn tight after engagement with the respective rings 28 and 31 to firmly brace the mast in vertical position while permitting free rotation of the mast and step.

Mounted on the mast above the sleeve 29 is a platform 32, shown in the form of a casting, and which casting is so shaped as to provide for the mounting of the boom 33, as clearly shown in Figure 6.

Above the platform and mounted on the mast is an electric hoist 34 directly below which is positioned a controller box 35, so that an operator supported on the platform 32 can conveniently operate the controller and thereby control the feed of current for operating the electric hoist 34. This hoist may be of any well known conventional form and may embody any number of drums as circumstances may dictate. However, we find it convenient to use a double drum hoist and with each of these drums associate a cable. These two cables are carried over open top sheaves 36 mounted at the top of the mast, one of said cables 37 extending to the boom for the purpose of raising and lowering the same, while the other cable 38 extends over an open end sheave 39 to the unloading tool 40, shown in the drawings as rail tongs.

Current for operating the electric hoist is fed from the generator set in the car I through the feed main 5 which extends back along the train to the controller box 35, as clearly shown in Figure 1.

In Figure 1, the apparatus is shown as fully mounted on the cars II and III and ready for operation. In practice, the boom and mast have to be made fairly heavy in order to obviate danger of breakage and inasmuch as the weight of these parts would render the mounting or demounting of the derrick rather difficult without a gang of men, we preferably provide a simple and efficient means whereby this mounting and demounting may be accomplished with maximum efficiency and ease.

In Figure 1, a davit 41 is illustrated as supported in the conventional post pockets of the car III. Open top cars are generally provided with such pockets and a relatively light davit can easily be lifted into place therein. Cars are made, however, without post pockets and while we may, in many cases, utilize post pockets for supporting the davit, we preferably employ a more universal type of mounting so that the davit may be attached to a car with or without the pockets. This davit mounting is shown in Figure 8.

In Figure 8, 45 designates the side of an open top car and 46 a supporting clamp adapted to be detachably mounted and rigidly held in place on the car by means of a thumb screw 47. The top of the supporting clamp is flat and on this flat top is adapted to rest a base 48 of a tubular standard 49. The base 48 may be secured to the clamp by bolts passed through alined holes in these parts or in any other suitable manner, but the connection is preferably of the demountable character. The davit 41 is, as shown in Fig. 1, but instead of seating within the post pockets of the car, its lower end is adapted to be received within the tubular standard 49. The clamp and davit support constitute a part of the standard equipment according to this invention and are used when post pockets are not convenient. If the pockets are convenient, the davit may be supported directly therein.

The free end of the davit is provided with an open side snatch block 42. If it is desired to demount the derrick from the position shown in Figure 1, the tongs 40 are first removed, the cable 38 is then lifted from the sheaves 39 and 36 and after being passed over the snatch block 42, the hook carried by the free end of the cable is engaged with the lifting shackles 43 provided on the boom, as shown in Figures 4 and 5.

The cable 38 is thereupon wound upon the electric hoist until it is fairly taut. The hasps 25 are thereupon released from the keepers 26 to release the bed plate from the stirrups and the guy stays 27 are detached to release these stays from the car. This having been accomplished, the cable 38 is further wound up to cause the bodily shifting of the bed plate off of the stirrups. When it has been lifted free, it is maintained in lifted position and the davits swung around until the derrick has been moved between the cars, whereupon the parts may be lowered until they come to rest on the ground. To mount the derrick, the operations described are reversed.

In the manner described, the derrick may be mounted and demounted with reference to the stirrups by employing the lifting cable of the derrick. We may, however, provide the electric hoist 34 with a third drum and use an extra cable with this drum for mounting and demounting the derrick. In either event, the lifting of the derrick into and out of place manually as by gangs of workmen is unnecessary and the work is accomplished more expeditiously and efficiently.

The adaptability of the invention to be readily mounted and demounted provides for the expeditious shifting of the derrick longitudinally of the train. In practice, we preferably provide a plurality of at least two mountings, so that while the derrick is being operated to unload the cars II and III, for example, another set of stirrups can be installed between the cars IV and V, so that when the unloading of the cars II and III is completed, the mounting between the cars IV and V will be ready to receive the derrick and it can be readily shifted into the latter position without loss of time. While the derrick is operating in this latter position, the mounting which was previously used between the cars II and III may be shifted to two other cars in the train for subsequent use.

The present invention has a pronounced appeal to those familiar with the railway maintenance because of its pronounced simplicity and economy. It entirely obviates the employment of separate derrick cars which are now almost universally employed and by dispensing with the necessity of such cars not only eliminates the necessity for big capital investment, but also provides for a more efficient and expeditious unloading of the cars of the train. One unloading device of the character described will unload an entire train without requiring any switching of the train and nothing of this sort has ever been provided heretofore in this art. When not in use, the equipment can be stored under cover free from deteriorating effects of exposure and weather conditions and it may be thus kept in perfect condition for immediate use when desired.

An important practical advantage of the invention is found in the fact that it eliminates the necessity of having a locomotive present when rails are to be unloaded in a storage yard or depot. Under prior practice the locomotive is required to be present to furnish compressed air for operating the lifting mechanism. The present invention, however, provides means whereby the device can operate without the locomotive being present. Furthermore, it eliminates the necessity of hauling a car unit in a work train with machinery and superstructure mounted on it. This is always a source of hazard in railway maintenance and the elimination thereof is important from a practical standpoint. Too much emphasis, however, cannot be laid upon the fact that when the present invention is employed, the switching of the train is unnecessary to effect the unloading of consecutive cars. By the present invention, no switching whatever is necessary. It is also possible in carrying out the present invention in practice to operate more than one hoisting device at a time on the same train in cases where rapid unloading of an entire train is desired in the quickest possible time.

From a standpoint of construction, the present invention is a marked departure from that which has gone before. The apparatus is so constituted that it is mounted conjointly upon two adjacent cars, both of these cars cooperating to simultaneously effect the mounting of the apparatus. The advantage of this arrangement is that a hoisting apparatus operates to better advantage when it is mounted directly on the car which is being unloaded. By mounting the apparatus on two adjacent cars simultaneously it can unload with greater efficiency from both cars, than if it were mounted entirely on one of them. Moreover, a more simple and convenient mode of mounting can be adapted to a conjoint supporting of the apparatus on two cars and the apparatus may be more efficiently stayed or guyed. Moreover, when the apparatus is mounted between two cars, it will have the greatest range of operation in both of them.

The invention is particularly intended for the unloading of rails. We are aware, however, that it may be used for other purposes and do not therefore limit the invention to the specific environment for which it was initially conceived. For example, in lieu of the rail tongs, a clam-shell bucket or any other suitable tool may be employed depending upon the particular work to be done.

The drawings show the invention in its preferred practical form, but the invention is to be understood as fully commensurate with the appended claims.

Having thus fully described the invention, what we claim as new and desire to secure by Letters Patent is:

1. In an apparatus of the character described, a derrick support embodying a suitable base adapted to be positioned between the contiguous ends of two adjacent cars of a train and below the tops of said cars, means for securing the forward end of the base to the forward car, means for securing the rearward end of the base to the rear car, and a derrick stepped upon said base for rotary movement thereon.

2. In an apparatus of the character described, a mast step positioned intermediate and exterior the ends of two contiguous cars of a train, clamping means for suspending the forward end of the mast step on the rear end of the forward car, clamping means for suspending the rear end of the mast step upon the forward end of the rear car, and a derrick mounted on said step, said mast step being positioned below the tops of said cars.

3. In an apparatus of the character described, derrick supporting means adapted to be positioned in between consecutive cars of a train to leave the floors of said cars entirely unencumbered by the supporting means, and means for securing the derrick supporting means to both cars and in fixed position relative to said cars, whereby the supporting means is conjointly carried by both cars, and a derrick mounted on said supporting means.

4. In an apparatus of the character described, derrick supporting means adapted to be positioned between consecutive cars of a train and between the tops and bottoms of the car bodies to leave the car floors unencumbered by the supporting means, and means for securing the derrick supporting means to both cars and in fixed position relative to said cars, whereby the supporting means is conjointly carried by both cars, and a derrick detachably mounted on said supporting means, in combination with means detachably supported on one of the cars and adapted to assist in the mounting or demounting of the derrick with respect to the supporting means of the latter.

5. In an apparatus of the character described, a mast step adapted to be positioned between the contiguous ends of two consecutive gondola cars of a train, means associated with the mast step for firmly clamping the step in position with respect to both cars, a derrick mast and boom rotatably supported on the mast step, and hoisting mechanism associated with the mast and boom.

6. In an apparatus of the character described, a derrick positioned intermediate the contiguous ends of two consecutive cars of a train and conjointly supported on both of said cars, to leave the floors unencumbered for their full lengths.

7. In an apparatus of the character described, derrick supporting means positioned intermediate the contiguous ends of two consecutive cars of a train and free from engagement with the car floors to leave them unencumbered, means for securing said supporting means to both of said cars conjointly, whereby the supporting means is dependent upon both cars for its support, a derrick mounted on the supporting means and guy stays extending from the derrick to both cars.

8. In an apparatus of the character described, a supporting bed positioned intermediate and detachably mounted in fixed position upon two consecutive cars of a train and below the tops of the cars, and a derrick mounted for pivotal movement on a vertical axis on said supporting bed.

9. In an apparatus of the character described, a derrick supporting bed positioned between consecutive cars of a train below the tops of the cars, means to support the bed in a position on both cars simultaneously and to permit of movement between the cars due to lost motion in the car coupling without release of the derrick supporting bed, and a derrick supported on said bed.

10. In an apparatus of the character described, derrick supporting means adapted to be positioned between two consecutive cars of a train and embodying clamping devices to clamp the suporting means to both cars to support said means on both cars conjointly between the tops and bottoms of the cars and exteriorly of and beyond said car ends, and a derrick detachably mounted on said supporting means.

11. In an apparatus of the character described, at least one derrick supporting saddle positioned intermediate consecutive cars of a train, clamping devices associated with the saddle for clamping the saddle to both cars to mount said saddle on said cars conjointly, and a derrick demountably supported on said saddle.

12. In an apparatus of the character described, a pair of saddles positioned between consecutive cars of a train and on opposite sides of the car coupling, means for securing both saddles to both cars to support the saddles on the cars in normally rigid relation with respect thereto, and a derrick mounted on said saddles.

13. In an apparatus of the character described, a pair of saddles positioned between consecutive cars of a train and on opposite sides of the car coupling, means for securing both saddles to both cars to support the saddles on the cars in normally rigid relation with respect thereto, a bed plate detachably mounted on said saddles, and a derrick pivotally mounted on said bed plate.

14. In an apparatus of the character described, a pair of saddles adapted to be positioned between consecutive cars of a train and each of which is provided at its opposite ends with projections adapted to extend under the contiguous ends of said cars, clamping devices associated with the saddles for drawing and maintaining said projections tightly against the under sides of said cars to mount the saddles on both cars conjointly, and means for detachably securing a derrick to said saddles.

15. In an apparatus of the character described, a pair of saddles adapted to be positioned between consecutive cars of a train and each of which is provided at its opposite ends with projections adapted to extend under the contiguous ends of said cars, clamping devices associated with the saddles for drawing and maintaining said projections tightly against the under sides of said cars to mount the saddles on both cars conjointly, a bed plate adapted to be detachably mounted on said saddles, and a derrick rotatably mounted on the bed plate.

16. In an apparatus of the character described, a pair of saddles adapted to be positioned between consecutive cars of a train and each of which is provided at its opposite ends with projections adapted to extend under the contiguous ends of said cars, clamps associated with said saddles and adapted to engage the upper portions of contiguous ends of the cars in clamping relation thereto, said clamps being provided with depending threaded shanks passing through apertures in the saddles, nuts associated with the shanks for drawing the projecting ends of the saddles into tight engagement with the under sides of the cars to mount the saddles firmly on said cars, and means for detachably mounting a derrick on the saddles.

17. In an apparatus of the character described, a pair of saddles adapted to be positioned between consecutive cars of a train and each of which is provided at its opposite ends with projections adapted to extend under the contiguous ends of said cars, clamps associated with said saddles and adapted to engage the upper portions of contiguous ends of the cars in clamping relation thereto, said clamps being provided with depending threaded shanks passing through apertures in the saddles, nuts associated with the shanks for drawing the projecting ends of the saddles into tight engagement with the under sides of the cars to mount the saddles firmly on said cars, and means for detachably mounting a derrick on the saddles, in combination with a davit, or its equivalent, detachably mounted on one of the cars and adapted to cooperate with the derrick in the mounting or demounting of the latter with respect to said saddles.

18. In an apparatus of the character described, derrick mounting means adapted to be positioned exteriorly of and intermediate the contiguous ends of the bodies of two consecutive gondola cars of a train and embodying a suitable base supported conjointly by both cars below the tops thereof, a derrick mast stepped on said base for rotation thereon, a boom pivoted to the mast, and an electric hoist carried by the mast for operating said boom, and a tool associated therewith.

In testimony whereof we have signed the foregoing specification.

WILLIAM E. DICKINSON.
JOSEPH J. MORGAN.